(12) United States Patent
Erten

(10) Patent No.: US 10,130,197 B2
(45) Date of Patent: Nov. 20, 2018

(54) SUPPORT MATERIAL HAVING AN HOURGLASS SHAPE

(71) Applicant: Tansel Erten, Riverview, FL (US)

(72) Inventor: Tansel Erten, Riverview, FL (US)

( * ) Notice: Subject to any disclaimer, the term of this patent is extended or adjusted under 35 U.S.C. 154(b) by 2 days.

(21) Appl. No.: 15/062,269

(22) Filed: Mar. 7, 2016

(65) Prior Publication Data

US 2017/0253677 A1    Sep. 7, 2017

(51) Int. Cl.
| | |
|---|---|
| *C08F 14/14* | (2006.01) |
| *A47G 9/10* | (2006.01) |
| *A42B 3/04* | (2006.01) |
| *A43B 1/00* | (2006.01) |
| *A43B 7/00* | (2006.01) |
| *B68G 1/00* | (2006.01) |
| *A43B 13/18* | (2006.01) |
| *A42B 3/12* | (2006.01) |

(52) U.S. Cl.
CPC ............. *A47G 9/10* (2013.01); *A43B 1/0009* (2013.01); *A43B 1/0045* (2013.01); *A43B 13/181* (2013.01); *A43B 13/187* (2013.01); *A47G 9/1036* (2013.01); *B68G 1/00* (2013.01); *A42B 3/12* (2013.01); *B68G 2001/005* (2013.01); *C08F 2500/24* (2013.01)

(58) Field of Classification Search
None
See application file for complete search history.

(56) References Cited

U.S. PATENT DOCUMENTS

| | | | | |
|---|---|---|---|---|
| 4,502,234 | A * | 3/1985 | Schaefer ................. | A47C 27/15 36/28 |
| 7,037,571 | B2 * | 5/2006 | Fish ........................ | A43B 13/02 36/37 |
| 7,255,917 | B2 * | 8/2007 | Rochlin ................ | A47C 27/086 428/304.4 |
| 2001/0042271 | A1 * | 11/2001 | Pearce ..................... | A47C 3/16 5/652 |
| 2008/0016621 | A1 * | 1/2008 | Chung .................... | A47G 9/007 5/636 |
| 2009/0025743 | A1 * | 1/2009 | Dragos .................. | A45D 29/22 132/73 |
| 2014/0117071 | A1 * | 5/2014 | Kannankeril .......... | B65D 81/03 229/68.1 |

\* cited by examiner

*Primary Examiner* — Alexandre F Ferre
(74) *Attorney, Agent, or Firm* — Tiffany C. Miller; Inventions International Inc.

(57) ABSTRACT

A support material having an hourglass shape reduces the cost of manufacturing as well as increasing comfort and air circulation. The support material includes a primary end having a primary diameter located opposite a secondary end having a secondary diameter. A substantially central portion of the support material has a tertiary diameter being a size less than the primary and secondary diameters. Additional improvements include an improved outer wall surface of the support material having at least one recess. The at least one recess can retain a substance such as a cooling gel.

4 Claims, 3 Drawing Sheets

SUPPORT MATERIAL HAVING AN HOURGLASS SHAPE

BACKGROUND OF THE INVENTION

1. Field of the Invention

This invention relates, generally, to a support material for a pillow or for slippers. More particularly, it relates to support material a having an hourglass shape.

2. Background Art

U.S. patent application Ser. No. 11/175,681 discloses a comfort pillow having a pellet filling. The pellet filling has a plurality of spherical hot stamped pellets, whereby, small fibers are connected to each neoprene pellet. The small fibers extend from the surface of each neoprene pellet. It would be more desirable for the support material to provide more comfort to a user and to increase airflow circulation around the support material to have a cooling effect. Thus, there is a need for a support material having an hourglass shape. This improved support material shape eliminates the need for the introduction of miniature fibers onto the pellet during the hot stamping process which drastically reduces costs of manufacturing.

Currently, commercially available support material for pillows includes open-celled foam or feathers. These pillows may not maintain their original shape after repeated use from a user. Additionally, many pillows contain support material that cannot withstand being washed in a washing machine without destroying the shape of the pillow, thereby, rendering the pillow useless for supporting a user. Thus, there is a need for a support material capable of being washable so that the pillow can be sanitized while maintaining the intended pillow shape.

Previously, certain support materials used for filling an object such as a slipper cannot maintain the shape of the slipper after being subjected to the force from the weight of a user standing on the slipper. For instance, the support material of a slipper being a single layer of foam will conform to the shape of a user's foot as the weight is forced upon the support material. However, eventually over time, the foam loses its structural ability to reform it's original shape when a user removes the force from their body weight from the support material. What is therefore needed is a support material capable of supporting a user and maintaining the shape of the object being filled after repeated use of the object by a user.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a support material having an hourglass shape, the support material includes a primary end having a primary diameter located opposite a secondary end having a secondary diameter, a substantially central portion has a tertiary diameter being a size less than the primary and secondary diameters, an outer wall surface of the support material has at least one recess, the at least one recess can retain a substance such as a cooling gel which also includes improvements that overcome the limitations of prior art support materials is now met by a new, useful, and non-obvious invention.

The novel support material has a primary end located opposite a secondary end. The primary end has a primary diameter. The secondary end has a secondary diameter. The support material has a substantially central portion having a tertiary diameter. The tertiary diameter has a size less than the primary diameter. The tertiary diameter has a size less than the secondary diameter forming an hour glass shape.

In a preferred embodiment, the support material is made of a closed celled material, including, but not limited to neoprene foam or neoprene rubber. A closed celled material is capable of being washed and dried. For example, a pillow or slippers that are filled with the novel support material being of a neoprene material can be washed and dried without damaging the shape or without negatively altering the comfort level of the pillow or slippers. Although not a preferred embodiment, the support material is made of an open celled material, including but not limited to, polyurethane foam or rubber.

It is within the scope of this current invention for the support material to be a pellet having an hour glass shape. It is a preferred embodiment for each pellet to have a primary end and a secondary end having a size between 8 mm-12 mm in diameter, a substantially central tertiary portion having a diameter being less than both the primary end and the secondary end, and to have a pellet length of approximately 20 mm. In an alternate embodiment, the pellet length has a range from 2 mm to 100 mm and a height ranging from 2 mm to 50 mm. For example, a novel pellet having a smaller size is more comfortable for a user when used as a filling material for a slipper or a neck pillow. A novel pellet having a larger size is more comfortable for a user when used as filling material for a pet bed or a bean bag chair. It is within the scope of this invention for the support material to be manufactured by a heat stamp process.

In a preferred embodiment, a plurality of novel pellets having an hour glass shape are capable of filling any conformable object including, but not limited to, a pillow, a spa pillow, neck pillow, lumbar support pillow for the office, a pet bed, a sleeping pillow a slipper, a bean bag chair, padding for a helmet, any padding, shoes, sandals, a chair cushion, or a floor pad. It is within the scope of this invention for the novel pellets to be retained within one compartment of a conformable object.

In a second embodiment, the novel support material having an hourglass shape can have at least one recess located on an outer wall surface of the support material. The at least one recess can facilitate in air circulation around the novel support material by the formation of pockets of cooler air. The at least one recess can retain a substance including, but not limited to, a gel or scented oil. This gel could have a cooling effect on a user and can increase user comfort when a user's force is applied to the supporting material. For instance, when a user's head is leaning upon a pillow filled with the novel support material or when a user's foot is standing on a slipper filled with the novel support material. It is within the scope of this invention for the substance to be aromatic. The novel support material having a scented substance is beneficial in eliminating odor from slippers and the aroma therapy aspect of the scent can facilitate in the relaxation of a user in close proximity to an object retaining the novel support material.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
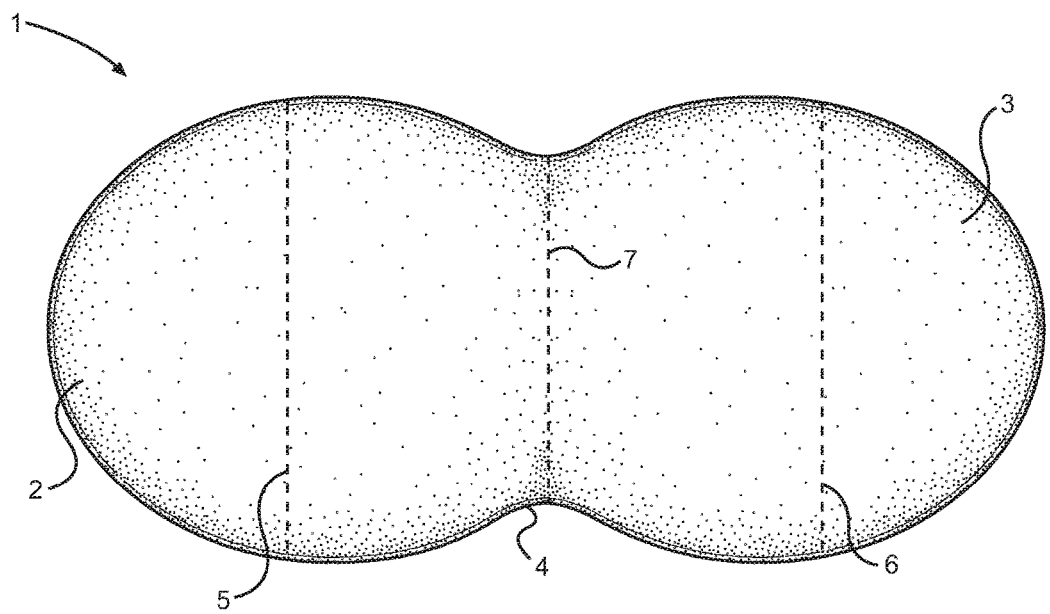
FIG. 1 is a side perspective view of the novel support material.
Figure 2:
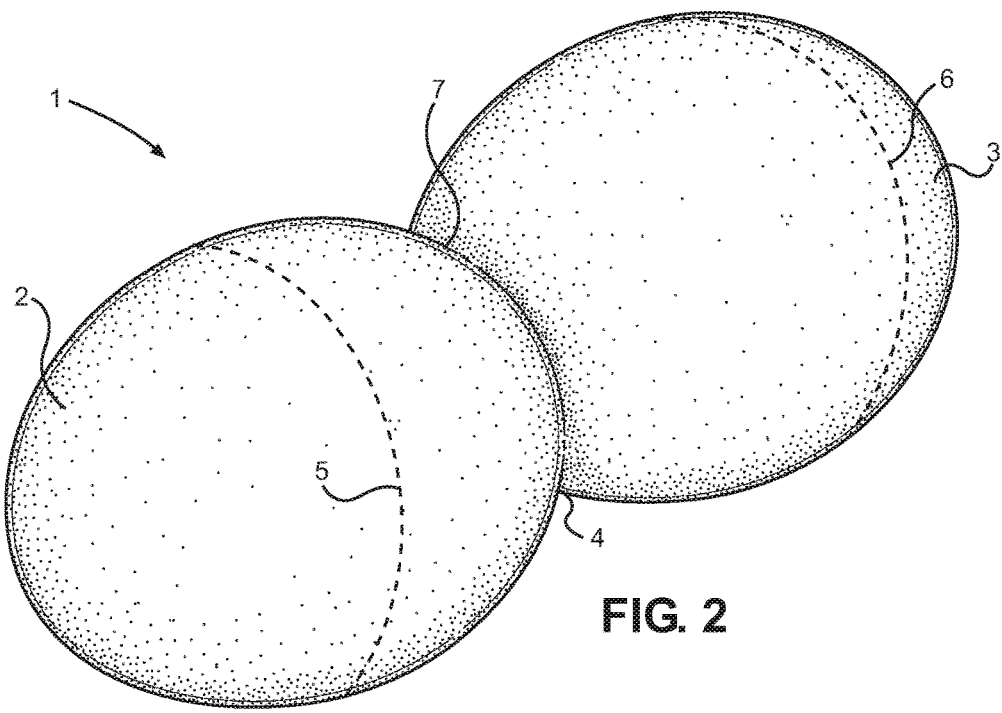
FIG. 2 is a front perspective view of the novel support material.

In a general embodiment the novel support material is hour glass shaped. It will now be seen, referring to FIGS. 1-2, novel support material 1 has primary end 2 located opposite secondary end 3. Primary end 2 has primary diameter 5. Secondary end has secondary diameter 6. Support material 1 has substantially central portion 4 having tertiary diameter 7 being a size less than primary diameter 5 and secondary diameter 6.

Figure 4:
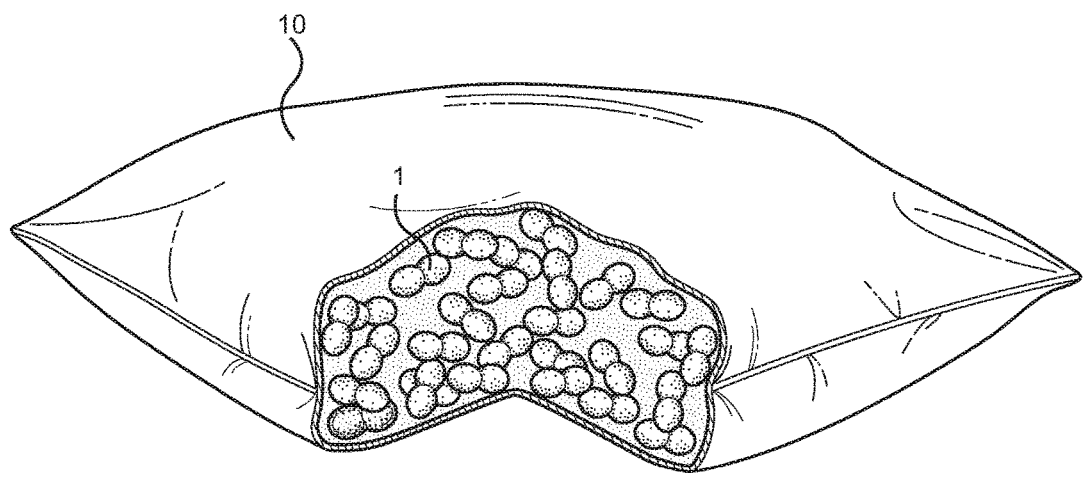
FIG. 4 is a side cut away view of a pillow retaining a plurality of novel support materials; and, FIG. 5 is a perspective cut away view of a slipper retaining a plurality of novel support materials.
Figure 5:
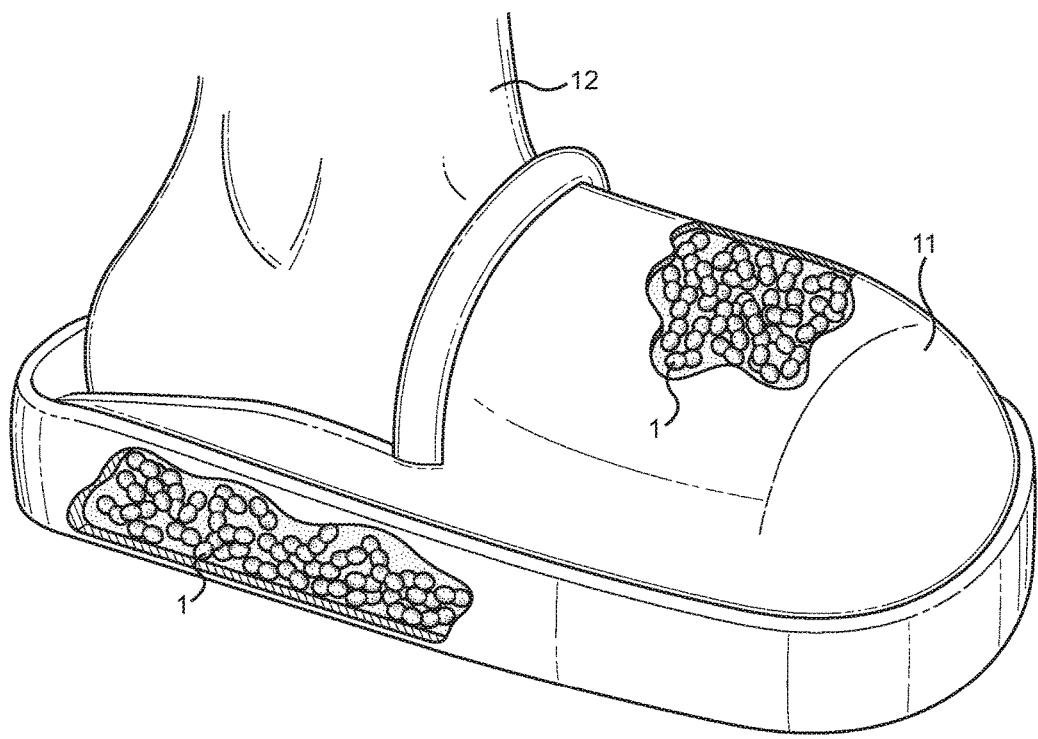

In a preferred embodiment, FIG. 4 illustrates pillow 10 retaining a plurality of novel support materials 1. FIG. 5 depicts slipper 11 retaining a plurality of novel support materials 1. The force of a user 12 is applied to support material 1 when a user wears slipper 1. The hour glass shape of support material 1 has a massaging effect on the foot of user 12.

Figure 3:
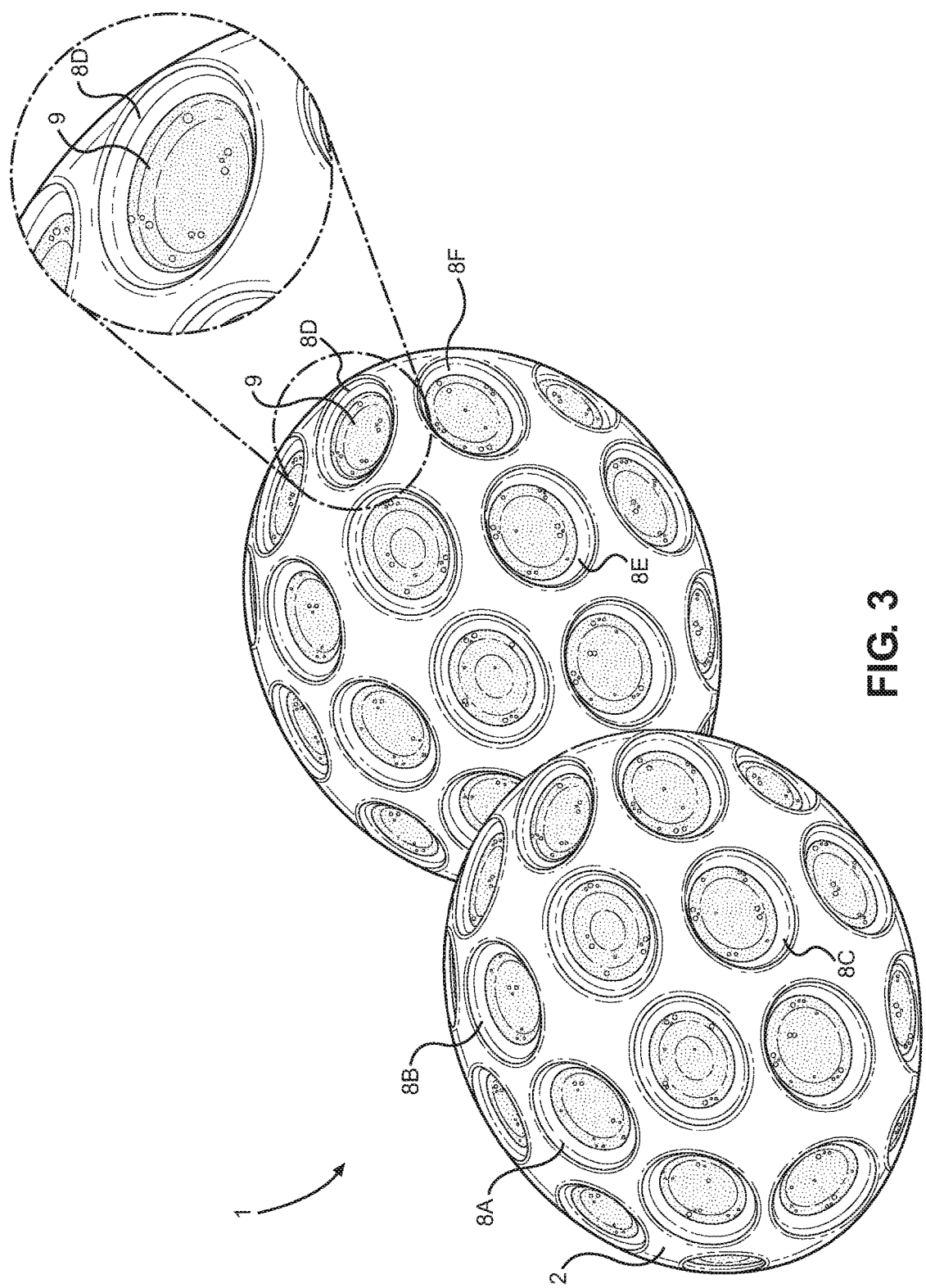
FIG. 3 is an alternate close-up perspective view of the support material having a plurality of recesses located on an outer wall surface of the support material, the recesses retaining a gel.

In an alternate embodiment, FIG. 3 shows novel support material 1 having a recess 8A-8F located on an outer wall surface 13 of support material 1. It is within the scope of this invention for support material 1 to have a plurality of recesses (FIG. 3) located on outer wall surface 13 of support material 1. FIG. 3 illustrates recess 8D retaining substance 9 within recess 8D. The substance may be aromatic for a desirable fragrance or antibacterial for a disinfecting solution.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described.

The invention claimed is:

1. Support material, comprising:
    a plurality of integrally formed pellets, wherein said plurality of integrally formed pellets are configured to be retained by a conformable object
    said support material being an open-celled material, said support material having at last one recess located on an outer wall surface of said support material, said at least one recess retaining a substance within said at least one recess, said substance is a gel;
    a conformable object, said plurality of integrally formed pellets are located inside of said confirmable object; and,
    said plurality of integrally formed pellets comprising an integrally formed pellet having a first radial end located opposite a second radial end, said first radial end of said integrally formed pellet having a first diameter, said second radial end of said integrally formed pellet having a second diameter, a substantially central portion, whereby, said substantially central portion of said integrally formed pellet having a third diameter, said third diameter of said substantially central portion of said integrally formed pellet being of a size less than said first diameter, said third diameter of said substantially central portion of said integrally formed pellet being of a size less than said second diameter.

2. The support material of claim 1, further comprising said substance has a fragrance.

3. Support material, comprising:
    a plurality of integrally formed pellets wherein said plurality of integrally formed pellets are configured to be retained by a conformable object
    said support material being a closed-celled material, said support material having at last one recess located on an outer wall surface of said support material, said at least one recess retaining a substance within said at least one recess, said substance is a gel;
    a conformable object, said plurality of integrally formed pellets are located inside of said confirmable object; and,
    said plurality of integrally formed pellets comprising an integrally formed pellet having a first radial end located opposite a second radial end, said first radial end of said integrally formed pellet having a first diameter, said second radial end of said integrally formed pellet having a second diameter, a substantially central portion, whereby, said substantially central portion of said integrally formed pellet having a third diameter, said third diameter of said substantially central portion of said integrally formed pellet being of a size less than said first diameter, said third diameter of said substantially central portion of said integrally formed pellet being of a size less than said second diameter.

4. The support material of claim 3, further comprising said substance has a fragrance.

* * * * *